Aug. 14, 1956     J. W. SUTCLIFFE     2,758,608
TIRE STEM INFLATION VALVE
Filed Aug. 29, 1952
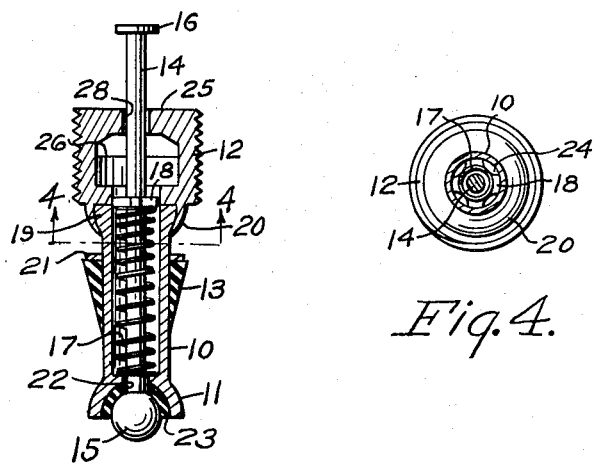
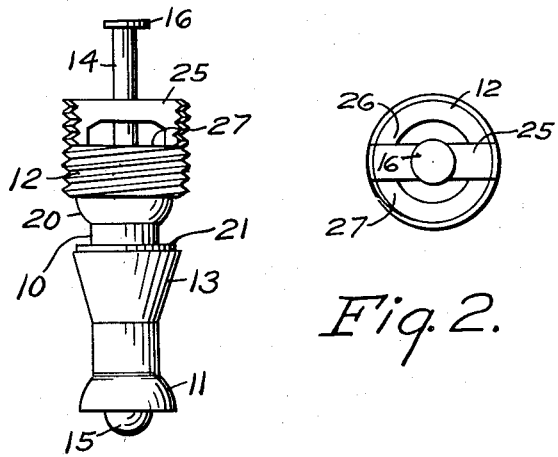
INVENTOR.
John W. Sutcliffe
BY Victor J. Evans & Co.
ATTORNEYS

United States Patent Office 2,758,608
Patented Aug. 14, 1956

2,758,608

TIRE STEM INFLATION VALVE

John William Sutcliffe, Barrington, R. I.

Application August 29, 1952, Serial No. 307,091

1 Claim. (Cl. 137—234.5)

This invention relates to valves or valve cores of the type used in inner tubes of motor vehicle tires, and in particular a valve having a ball on the end of a stem with the stem extended through a sleeve having an externally threaded nut rotatably mounted on the outer end, a semi-spherical cup with a similarly shaped washer of resilient material therein on the inner end, with a spring in the sleeve for urging the extended end of the stem outwardly of the nut and with a frusto-conical shaped resilient packing element on the outer surface of the sleeve.

The purpose of this invention is to provide a valve core for the tubular valve stem of a motor vehicle tire inner tube wherein the pressure of air in the tube retains the valve in a sealed position.

Valve elements have been provided of various designs, however, where a valve is used continuously, such as a tire valve, and also where a valve is subjected to dirt and other foreign matter, it is difficult to form parts whereby a positive and permanent seal is provided in the valve stem. With this thought in mind this invention contemplates a valve having a ball on the inner end of the stem with the ball positioned to coact with a resilient cup shaped washer into which the ball nests and in which the washer is provided on the end of a sleeve having a sealing resilient washer on the outer surface.

The object of this invention is, therefore, to provide means for forming a valve core of a motor vehicle tire inner tube valve whereby a valve element is substantially sealed in a supporting structure and the supporting structure is sealed in the tubular stem of the valve.

Another object of the invention is to provide an improved valve element for pressure valves, such as valves used on inner tubes of motor vehicle tires wherein the device may be used in the tubular valve stem without materially changing the design or structure of the stem.

A further object of the invention is to provide a positive sealing pressure valve which is of a simple and economical construction.

With these and other objects and advantages in view the invention embodies an externally threaded nut having a flat gripping section on the outer end with a sleeve secured to the nut with a swivel joint and having a semi-spherical cup on the end extended from the nut, a resilient washer in the cup, a stem having a head on the outer end extended through the nut and sleeve and having a ball on the end extended into the cup wherein the ball coacts with the washer of resilient material in the cup for sealing the passage throeugh the sleeve, and in which the ball is retained in sealing relation with the washer by a spring in the sleeve and the sleeve is retained in sealing relation with an outer tubular casing or stem with a resilient washer on the outer surface thereof.

Other features and advantages of the invention will appear from the following description taken in connection with the drawing, wherein:

Figure 1 is a side elevational view illustrating the improved valve core or element.

Figure 2 is a plan view looking downwardly upon the upper end of the element.

Figure 3 is a vertical or longitudinal section through the valve core showing the parts with a ball on the end of a stem extended through the valve in the closed position.

Figure 4 is a cross section through the valve element taken on line 4—4 of Fig. 3 with the spring omitted.

Referring now to the drawing, wherein like reference characters denote corresponding parts the improved valve core of this invention includes a sleeve 10 having a substantially semi-spherical cup 11 on the lower end, a nut 12 rotatably mounted on the upper end of the sleeve, a frusto-conical shaped resilient washer 13 positioned on the outer surface of the sleeve, a stem 14 having a ball 15 on the lower end and a head 16 on the opposite end extended through the nut and sleeve, a spring 17 positioned in the sleeve and extended around the stem 14 and a spider 18 carried by the stem and positioned to be engaged by the upper end of the spring.

The closure cup 11 which may be formed of rubber, plastic, metal or other suitable material is permanently secured to the end of the sleeve 10 and the upper end of the sleeve is provided with an annular bead 19 over which an arcuate flange 20 is positioned whereby the sleeve is rotatably mounted on the nut 12. By this means the sealing washer 13 which is frusto-conical shaped with a longitudinally disposed bore through which the sleeve extends is adapted to be clamped against a shoulder in an outer tubular stem or casing as the nut 12 is turned into the stem. The sleeve 10 is also provided with a collar 21 against which the large end of the washer 13 is positioned.

The cup 11 is provided with an enlarged centrally disposed opening 22 through which the stem 14 extends and the inner surface of the cup is provided with a gasket or washer 23 which may also be formed of rubber, plastic, metal or other suitable material.

The spider 18 is provided with notches 24 providing air passages from the interior of the sleeve 10 to the interior of the nut 12 whereby air is free to pass through the device with the head 16 of the stem pressed toward the nut 12, compressing the spring 17 and moving the ball 15 away from the washer 23.

The nut 12 is provided with a flat section 25 formed by notches or cutouts 26 and 27 at the sides and the stem 14 extends through an opening 28 in the flat section 25.

With the parts formed in this manner the valve element or core is inserted in a tubular valve stem with the frusto-conical shaped washer 13 seated against the inner surface of the stem and with the nut 12 threaded in the outer end of the stem.

By this means the area around the valve core is sealed with the washer 13 and the opening through the valve element is sealed by the ball 15 coacting with the washer 23.

It will be understood that modifications, within the scope of the appended claim, may be made in the design and arrangement of the parts without departing from the spirit of the invention.

What is claimed is:

A valve comprising a hollow sleeve, a semi-spherical cup arranged on one end of said sleeve and secured thereto, said cup being of a greater diameter than said sleeve, a nut rotatably mounted on the upper end of said sleeve and being of greater diameter than said sleeve, a frusto-conical shaped resilient washer positioned on the outer surface of said sleeve intermediate the ends thereof, the widest portion of said washer facing said nut, a cylindrical stem extending longitudinally through said nut and sleeve, a ball positioned on one end of said stem and being of greater diameter than said stem, a head on the other end of said stem of greater diameter than said stem, a coil spring positioned in said sleeve and circumposed on said stem with its lower end abutting said sleeve, a guide spider mounted on said stem and engaged by the upper end of said spring, a substantially semi-spherical annular bead on one end of said sleeve adjacent said nut, a flange depending from said nut and rotatably engaging and snugly fitting against said bead, said washer being provided with a longitudinally extending bore for the projection therethrough of said sleeve, an annular collar on said sleeve abutting the large end of said washer, said collar being spaced from said bead, a gasket of resilient material positioned contiguous to the inner surface of said cup for receiving said ball, said gasket and cup having their outer surfaces lying in the same plane, said spider being provided with a plurality of notches providing air passages, said nut being provided with a flat section having a central opening for the projection therethrough of said stem, said nut having notches therein for the passage of air to said sleeve.

References Cited in the file of this patent

UNITED STATES PATENTS

| | | |
|---|---|---|
| 248,902 | Whitman | Nov. 1, 1881 |
| 1,797,036 | Wolf | Oct. 20, 1930 |
| 2,033,512 | Carliss | Mar. 10, 1936 |
| 2,116,087 | Wahl | May 3, 1938 |
| 2,250,813 | Rea | July 29, 1941 |
| 2,284,971 | Broecker | June 2, 1942 |
| 2,313,142 | Genest | Mar. 9, 1943 |
| 2,451,276 | Crowley | Oct. 12, 1948 |
| 2,473,591 | Killner | June 21, 1949 |

FOREIGN PATENTS

| | | |
|---|---|---|
| 81,540 | Switzerland | Nov. 1, 1881 |
| 696,718 | France | Oct. 20, 1930 |